Oct. 19, 1926.

W. L. BLISS 1,603,830

LIGHTING AND POWER SYSTEM

Original Filed June 25, 1910

Inventor
William L. Bliss.

By Raymond H. Van Kest

Attorney

Patented Oct. 19, 1926.

1,603,830

UNITED STATES PATENT OFFICE.

WILLIAM L. BLISS, OF NIAGARA FALLS, NEW YORK, ASSIGNOR TO U. S. LIGHT AND HEAT CORPORATION, OF NIAGARA FALLS, NEW YORK, A CORPORATION OF NEW YORK.

LIGHTING AND POWER SYSTEM.

Original application filed June 25, 1910, Serial No. 568,909. Divided and this application filed October 6, 1920. Serial No. 415,037.

My invention relates to lighting and power system in which an internal combustion engine is used to drive a dynamo electric machine, the electric energy thus produced being used for lighting and power purposes, and also to charge a storage battery which may be subsequently used to supply energy to operate the dynamo electric machine as a motor for starting the internal combustion engine.

It is an object of the present invention to provide automatic switch control mechanism adapted to connect the dynamo electric machine either in starting relationship to the battery or in energy supply relationship to the battery and load circuits, whereby after the initiation of the starting function further manual control of the circuits is unnecessary.

It is a still further object of my invention to provide an arrangement and circuit connections whereby the output of the dynamo-electric machine shall be confined within safe limits in spite of great variations in speed, and wherein the dynamo-electric machine may be operated as an engine-starting motor without regulation of the input thereto.

This application is a division of my co-pending application, Serial No. 568,909, filed June 25, 1910.

In the drawings the same reference characters refer to similar parts in the several figures.

Figure 1:
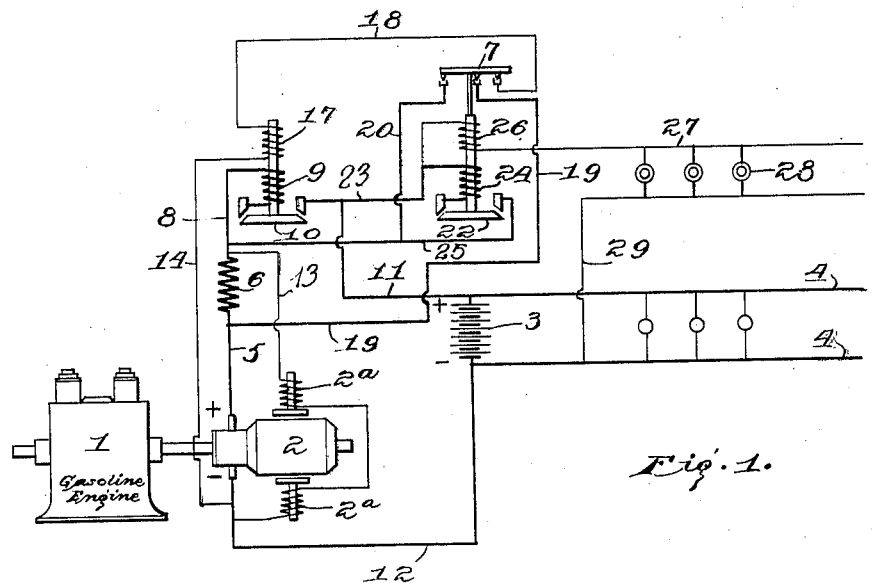
Figure 1 is a diagrammatic representation of a system embodying a preferred form of the present invention.

Referring to Fig. 1, an internal combustion engine 1 is shown connected directly to a shunt wound dynamo electric machine 2 and shunt field windings $2^a$. The dynamo electric machine when operating as a generator is adapted to supply current to the storage battery 3 and the load circuit 4 which are connected in parallel.

Two control switches are connected in parallel branches between the generator and storage battery. One of these switches which may be designated as the main switch, performs the function of the usual automatic switch in that it is adapted to connect the generator with the storage battery when the voltage of the former is equal to, or slightly in excess, of the latter, and also automatically opens the circuit to the storage battery when the generator voltage falls below that of the battery. The second switch or starter switch is operated by a remote control circuit and is used to connect the battery with the dynamo electric machine in order to permit current to flow from the battery thereto and run the same as the motor to start the engine. These switches are electrically interlocked so that when the starting switch is closed by the operator the main switch is rendered inoperative. The opening of the starting switch however restores the main switch to operative condition.

Under normal working conditions the circuit from the dynamo electric machine to the battery 3 is complete through conductor 5 around resistance 6 by means of short circuiting contacts 7 controlled by the starting switch then through conductor 8, reverse current release coil 9, main switch contact 10 and conductor 11. From the battery and lighting and power circuit 4 the circuit to the dynamo electric machine is complete through conductor 12. The shunt field coils of the dynamo electric machine are connected around resistance 6 by conductor 13 as illustrated.

Suitable means are provided for automatically closing the main switch 10 which includes a lifting coil 17 connected in a circuit across the dynamo electric machine terminals as follows: From positive terminal through conductors 5, 19, triple contacts 7, conductor 18, lifting coil 17, and conductor 14 to the negative terminal.

The motor starting switch 22 is connected in parallel with the main switch 10 and operates to close the circuit from the battery to the dynamo electric machine which under these circumstances will run as a motor. This circuit is from battery 3, conductors 11, 23, holding coil 24, switching contact 22, conductor 25 and dividing one branch through resistance 6, conductor 5 and armature 2 and the other branch through conductor 13 and field windings $2^a$ to conductor 12 back to battery. In order to initiate the operation of the starting switch 22, a lifting coil 26 is arranged in a circuit leading from the battery as follows: From battery 3, conductors 11, 23, coil 26, conductor 27, push buttons 28, conductor 29 and back to the battery. The push buttons may be located at convenient places and accordingly the system may be placed in operation from a distance if desired.

The operation of the system is as follows: Upon momentarily pressing any of the push buttons 28, the lifting coil 26 is energized by current from the battery 3, and closes the starting switch 22 which is thereafter automatically held in a closed position by the coil 24, which coil is now included in the circuit from the battery through the generator 2, including also resistance 6 which is intended to prevent damage to the armature and to prevent short circuiting of the battery. The push button may be immediately released after an operation and consequent initiation of the starting function as the coil 24 will hold the starting switch closed, all other circuit controlling operations thereafter being automatically performed. The shunt field windings 2ª are so connected as to be subjected to full battery voltage and hence a strong field with high starting torque is available.

The dynamo electric machine now operates as a motor and cranks the engine. After the engine assumes its normal cycle of operation, the dynamo electric machine no longer draws a heavy current from the storage battery. The dying out of this current causes the de-energizing of coil 24, the starting switch 22 therefore opening. The opening of switch contact 22 causes the triple contact switch 7 to close, which short-circuits the resistance 6 formerly in the armature circuit, and also connects the lifting coil 17 of the main switch in operative circuit. This control of the lifting coil 17 of the main switch by the starting switch prevents any possibility of the main switch 10 closing prematurely. As the speed of the engine and dynamo electric machine further increases, the generator voltage reaches a proper value and the lifting coil 17 of the main switch now functions to close switch contact 10 and complete the circuit from the generator to the battery and lighting circuit. Coils 17 and 9 are so wound that they assist each other in holding the switch 10 closed as long as current flows from the generator to the battery. Whenever the generator slows down however to a point where its voltage is below that of the battery reversal of current flow takes place in coil 9 owing to the fact that the battery discharges through the generator, thereby causing coil 9 to oppose coil 17 whereupon the switch 10 opens.

Under normal conditions the generator supplies both the battery 3 and the external lighting circuit 4. Whenever the generator is run at less than the proper speed however, or when it is not running at all, the storage battery alone supplies the lighting circuit. If the internal combustion engine is of a type requiring electrical ignition current from the battery may be utilized for this purpose.

Figure 2:
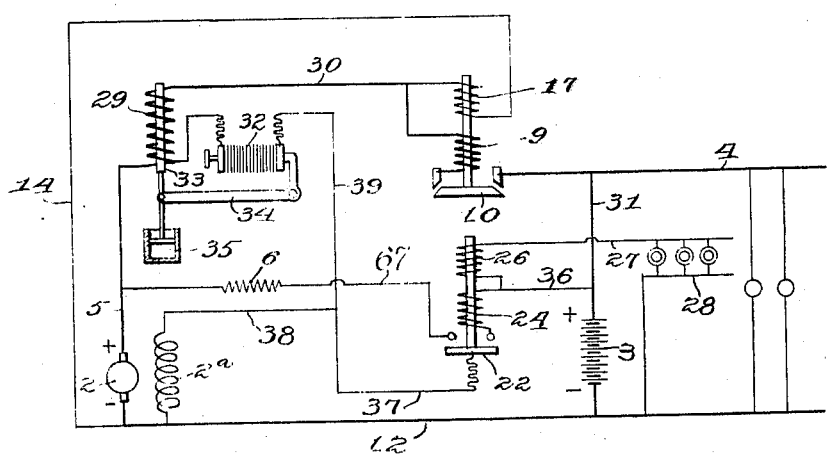
Fig. 2 is a similar representation of a modification.

Referring to Fig. 2 in which a modified form of system is disclosed, the generator 2 is shown as having a shunt field winding 2ª the main circuit of the generator being through conductor 5, solenoid 29, conductor 30, releasing coil 9, main switch contacts 10 through circuit 31 to the storage battery 3 and to the lighting and power circuit through conductors 4.

The shunt field 2ª of the dynamo electric machine has in series therewith the carbon pile resistance 32, the pressure on the carbon pile being regulated by the plunger 33 within the solenoid winding 29. This regulation is effected by means of the bell crank lever 34, the operation being steadied by the dash pot 35. The shunt field circuit is from the positive pole of the dynamo electric machine through conductor 5, resistance 32, conductors 38 and 39, shunt field windings 2ª and back to the negative pole of the dynamo electric machine. The closing of the main switch is effected by a lifting coil 17 which coil is in a shunt circuit around the terminals of the dynamo electric machine as follows: From the positive pole through conductor 5, solenoid 29, conductor 30, lifting coil 17 and conductor 14 to the negative terminal. A starting switch 22 is provided in parallel with the main switch 10 between the dynamo electric machine and the battery. When closed the switch contact 22 completes a circuit from the battery through conductor 36, holding coil 24, contact 22, conductor 67, resistance 6 to armature 2 and back to battery through conductor 12. The lifting of switch contact 22 also completes a circuit from the battery through conductor 36, switch contact 22 and conductor 37 to the shunt winding of the generator 2ª and back to battery through conductor 12, thus providing for the full battery voltage for the shunt field of the generator and also for the omission of the regulating resistance 32 during the starting operation. The starting switch is operated as before by means of a lifting coil 26, energized from the battery through conductors 27 and any of the plurality of remote control push buttons 28. The operation of this arrangement is as follows: Pressing any of the push buttons 28 causes the lifting coil 26 to be energized by battery current and the closing of starting switch contact 22 follows, thus completing a circuit from the battery through the dynamo electric machine field and armature and causing said generator to operate as a motor and start the engine in a manner heretofore described. As soon as switch 22 closes the holding coil 24 holds it in this position and the push button may be released thereby de-energizing lifted coil 26. As soon as the engine begins to drive the generator the voltage of the battery becomes balanced, and the current flowing through coil 24 is so reduced as to cause the motor starting switch 22 to open. As the voltage of the generator continues to increase a predetermined point is reached at which the lifting coil 17 is energized sufficiently to close the main switch 10, the generator thereby charging the battery and carrying the lamp load.

The function of the carbon pile regulator 45 is to regulate the output of the generator and to maintain the voltage of the same approximately constant irrespective of speed variation. The operation is briefly as follows: Normally the weight of plunger 33 keeps it in its lower-most position thereby producing a maximum pressure upon the pile of carbon disks and reducing their resistance accordingly. Upon rise in the current flow through solenoid 29 the plunger 33 is lifted, whereupon an increased resistance is introduced into the shunt field circuit of the generator, thereby weakening the field and reducing the current flow.

The foregoing embodiments of my idea are simply illustrative of some of the many practical forms which the present invention may assume and it is obvious that changes may be made including the omission of immaterial elements and the substitution of equivalents without departing from the scope of my invention, as defined in the appended claim.

What is claimed is:

In a device of the character described, the combination with an engine, a motor-generator, and connections between the engine and the motor-generator for starting the former by the latter and running the latter by the former, and an accumulator having electrical connections with the motor-generator; of means for regulating the current output during a determined range of speed of the generator; automatic means for disabling said regulating means during another range of generator speed in the generator operation; and means for changing the electrical connections to provide for an unregulated flow of current from the accumulator through the motor-generator to operate the machine as a high torque motor for starting purposes.

In witness whereof, I have hereunto subscribed my name.

WILLIAM L. BLISS.